(12) United States Patent
Slaughter

(10) Patent No.: US 10,584,511 B1
(45) Date of Patent: Mar. 10, 2020

(54) RECONFIGURABLE HUNTING BLIND

(71) Applicant: Good Sportsman Marketing, LLC, Grand Prairie, TX (US)

(72) Inventor: Jerry Micah Slaughter, Huntsville, TX (US)

(73) Assignee: Good Sportsman Marketing, LLC, Grand Prairie, TX (US)

( * ) Notice: Subject to any disclaimer, the term of this patent is extended or adjusted under 35 U.S.C. 154(b) by 0 days.

(21) Appl. No.: 15/642,688

(22) Filed: Jul. 6, 2017

Related U.S. Application Data

(63) Continuation-in-part of application No. 14/992,253, filed on Jan. 11, 2016, now Pat. No. 10,077,573.

(60) Provisional application No. 62/216,712, filed on Sep. 10, 2015, provisional application No. 62/101,594, filed on Jan. 9, 2015, provisional application No. 62/360,006, filed on Jul. 8, 2016.

(51) Int. Cl.
| | |
|---|---|
| *E04H 15/48* | (2006.01) |
| *E04H 15/00* | (2006.01) |
| *E04H 15/58* | (2006.01) |
| *E04H 15/56* | (2006.01) |
| *E04B 1/344* | (2006.01) |
| *A01M 31/02* | (2006.01) |

(52) U.S. Cl.
CPC .......... *E04H 15/001* (2013.01); *E04B 1/344* (2013.01); *E04H 15/48* (2013.01); *E04H 15/56* (2013.01); *E04H 15/58* (2013.01); *A01M 31/025* (2013.01)

(58) Field of Classification Search
CPC ......... E04H 15/02; E04H 15/48; E04H 15/18; E04H 15/34; E04H 15/54; E04H 15/58; E04H 15/56; E04H 15/64; E04H 15/001; E04H 15/008; E04B 7/028; E04B 1/34321; E04B 1/3445; E04B 1/344; E04B 7/107; A01M 31/025
USPC ... 135/96–97, 135, 137, 147, 116, 119, 152, 135/157–159, 901–902; 52/63, 82, 83, 52/70–72, 79.1; 182/187–188, 179.1
See application file for complete search history.

(56) References Cited

U.S. PATENT DOCUMENTS

| | | | | |
|---|---|---|---|---|
| 3,333,373 | A * | 8/1967 | Taylor | E04H 15/008 135/120.3 |
| 4,067,346 | A * | 1/1978 | Husted | E04H 15/001 135/153 |
| 4,640,061 | A * | 2/1987 | Trumley | E04B 1/34321 52/656.1 |
| 5,172,525 | A * | 12/1992 | Cook | E04H 15/001 135/901 |

(Continued)

*Primary Examiner* — Winnie Yip
(74) *Attorney, Agent, or Firm* — D'Ambrosio & Menon, PLLC; Usha Menon

(57) ABSTRACT

A duck blind is formed from first and a second panel assemblies. The first panel assembly has a first height and the second panel assembly has a second height that is less than the first height. Hunters can sit with their backs to the first panel assembly and stand to shoot over the second panel assembly. Improvements for blind windows in the panel coverings are disclosed. A flexible clear window cover covers the window opening from the inside. When a hunter wants to open the window, a releasable fastener system along the upper edge of the window cover can be disconnected and the clear window cover will swing down out of the way. An elevated blind formed from panels is disclosed. A hexagonal array of panels is positioned on a hexagonal platform to improve visibility from the blind in all directions.

2 Claims, 3 Drawing Sheets

(56) References Cited

U.S. PATENT DOCUMENTS

| | | | | |
|---|---|---|---|---|
| 5,813,160 A * | 9/1998 | Thoelke | ............... | A01M 31/025 135/121 |
| 5,862,827 A * | 1/1999 | Howze | ................ | A01M 31/025 135/140 |
| 6,539,966 B2 * | 4/2003 | Raines, Jr. | .......... | A01M 31/025 135/158 |
| 6,942,065 B1 * | 9/2005 | Price | ................... | A01M 31/025 135/901 |
| 7,040,335 B1 * | 5/2006 | Ransom | ................ | E04H 15/001 135/117 |
| 7,740,022 B2 * | 6/2010 | Li | ........................... | E04H 15/16 135/117 |
| 7,743,781 B2 * | 6/2010 | Slaughter | ............... | E04H 15/001 135/117 |
| 9,771,729 B2 * | 9/2017 | Workman | ................ | E04H 15/44 |
| 2013/0306121 A1 * | 11/2013 | Hung Lau | ........... | A01M 31/025 135/117 |

* cited by examiner

RECONFIGURABLE HUNTING BLIND

FIELD OF THE INVENTION

This invention relates to reconfigurable hunting blinds having modular features.

BACKGROUND OF THE INVENTION

Groups of hunters often hunt waterfowl together, while pursuit of deer is more often a solitary pursuit.

Waterfowl hunters need good visibility of the sky, whereas deer hunters typically prefer a darkened blind, to conceal their movements.

Waterfowl hunters are typically exposed the winds and breezes, whereas deer hunters are generally better served by a blind which reduces emissions of scent.

Deer hunters often find an elevated blind of benefit, whereas elevation usually doesn't benefit waterfowl hunters.

Features that are desirable in one type of blind are frequently undesirable in another.

It is an object of this invention to provide blinds having modular features to facilitate customization of the blind.

OBJECTS OF THE INVENTION

It is an object of this invention to provide blinds having modular parts that can be adapted to different end uses.

SUMMARY OF THE INVENTION

One embodiment of the invention provides a portable hunting blind assembly that is highly suitable for use as a duck blind. The blind comprises a first and a second accordion fold wall unit. The first wall unit has a first end and a second end and comprises an even-numbered plurality of panels of at least four in number. Each panel has a width and a first height and the wall unit has a pair of end panels bounding a straight row of interior panels and arranged at about a right angle with respect to the straight row of interior panels. The second wall unit has first end, a second end and comprises an even-numbered plurality of panels of at least four in number each having a width and a second height. The second accordion-fold wall unit has a pair of end panels bounding a straight row of interior panels and arranged at about a right angle with respect to the straight row of interior panels. The second height is in the range of about 60 percent to about 90 percent of the first height. The first end of the first standing accordion-fold wall unit abuts the first end of the second standing accordion-fold wall unit to define a rectangularly-shaped enclosed area. Hunters can position themselves with their backs to the first wall unit and stand to shoot over the second wall unit.

Another embodiment of the invention provides a clear window for a hunting blind that can be dropped out of the way. The window is attached to the covering for the panel. The covering has a front side and a back side, a height and a width, the height being greater than the width, and an upper portion and a lower portion. A generally rectangular window opening is formed in the upper portion of the panel covering. The window has a length and a width, the width being greater than the length and being measured parallel to the width of the generally rectangular piece of panel covering. A flexible clear window cover having a front side and a back side covers the generally rectangular window opening from the inside. The clear window cover has a length and a width that is slightly greater than the window opening. The clear window covering is attached to the inside of the panel covering by its lower edge along the lower edge of the window opening, and is held in covering relationship with the window opening by a releasable fastener system connecting the upper edge of the clear window covering with the back side of the panel covering. When a hunter wants to open the window, the releasable fastener system can be disconnected and the clear window cover will swing down by gravity out of the way. The plastic window helps keep cold out, and scents in.

In another embodiment of the invention, elevation of a hunting blind is provided by mounting on a platform. The platform comprises a hexagonal frame formed from straight sections of angle stock positioned to have a leg extending upwardly. A floor is positioned in the hexagonal frame. A portion of the angle stock protrudes above the floor periphery to form a peripheral lip around the floor. A plurality of legs extends downwardly and outwardly from the frame to elevate the platform above ground level. The hunting blind comprises six panels joined together for accordion folding positioned on the platform with a base of each panel adjacent to the lip of a straight section of angle stock to register the blind in fixed position on the platform. A few feet of elevation can extend visual coverage from a blind markedly in weeds, brush or rolling terrain.

In another embodiment of the invention provides a portable hunting blind with an improved connection system for a roof formed from fabric or like. The portable hunting blind comprises a plurality of panels, a roof frame, and a roof covering. The plurality of panels each has a generally rectangular frame joined together with adjacent frames for accordion folding. At least one frame of the plurality mounts a door comprising a generally rectangular frame. The frames are covered with a camouflage material to form the panels and positioned in a standing arrangement to form a closure. The roof frame connects upper ends of the panel frames. The roof covering is positioned over the roof frame and has having a peripheral lip extending over an outer surface of the upper ends of the panels and the upper end of the frame mounting the door. Straps depend from the lip and carry fastener halves for engaging complementary fastener halves on the outer surfaces of the panels, except for the door panel, to retain the roof in position. The straps provide better purchase than the lip for pulling the roof into position and are more tolerant of misalignments of the fastener halves.

DETAILED DESCRIPTION OF THE INVENTION

Figure 1:
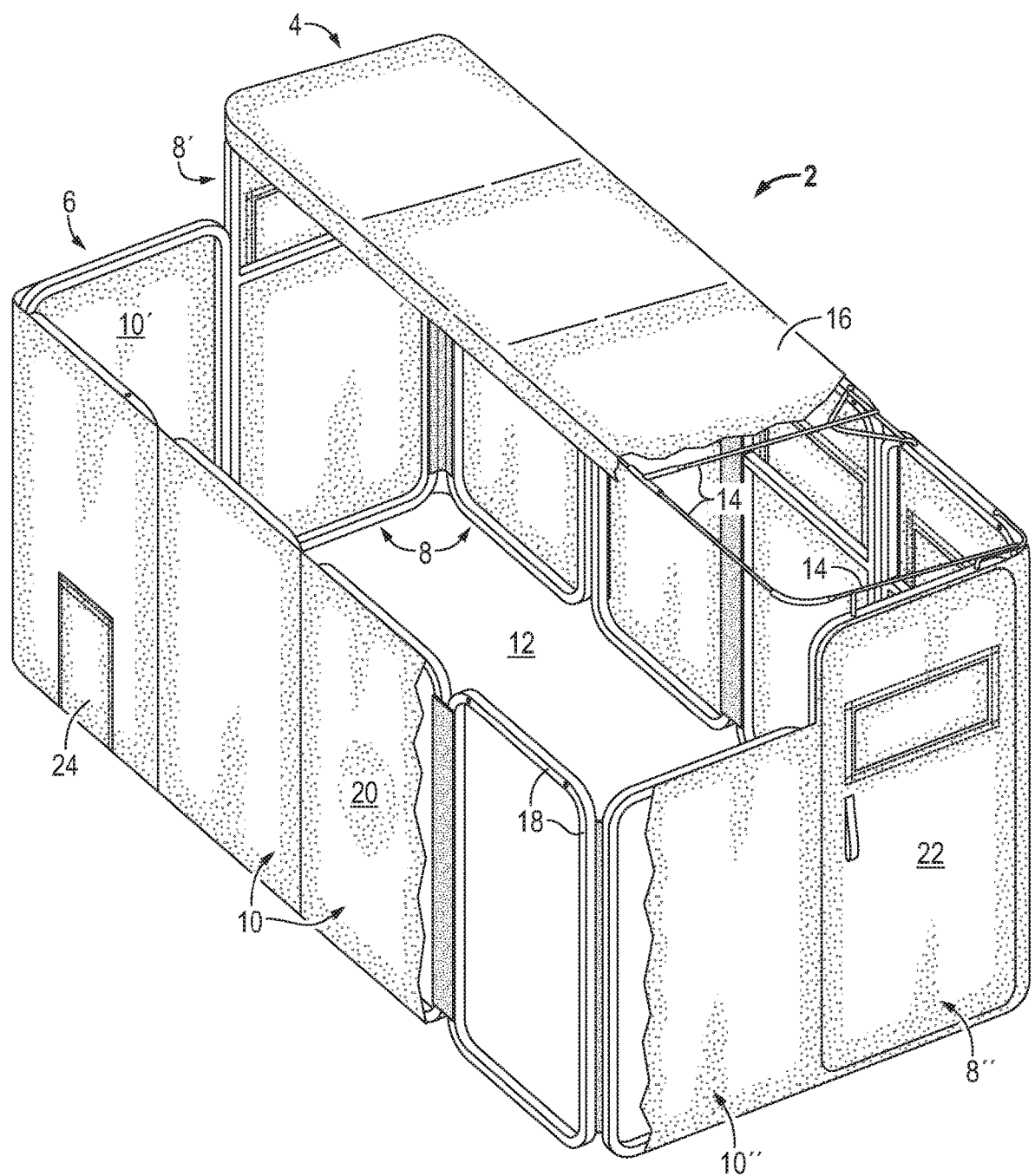
FIG. 1 is an isometric view of a duck blind according to an embodiment of the invention having portions broken away to show internal details.
Figure 2:
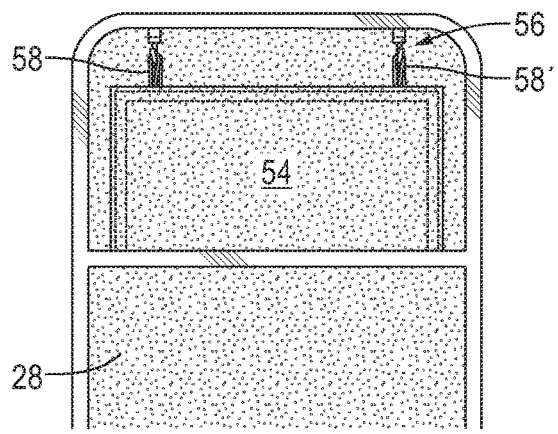
FIG. 2 is a plan interior view of a window for a hunting blind panel and a blackout covering in place blocking visibility through the window.
Figure 3:
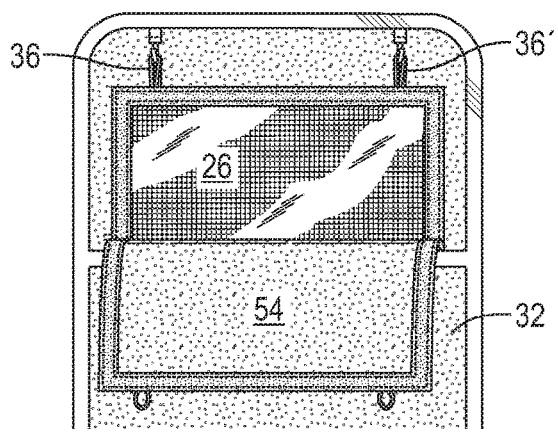
FIG. 3 is a plan interior view of a window for a hunting blind panel having the blackout covering folded down to permit visibility through the window via a clear window covering and screen.
Figure 4:
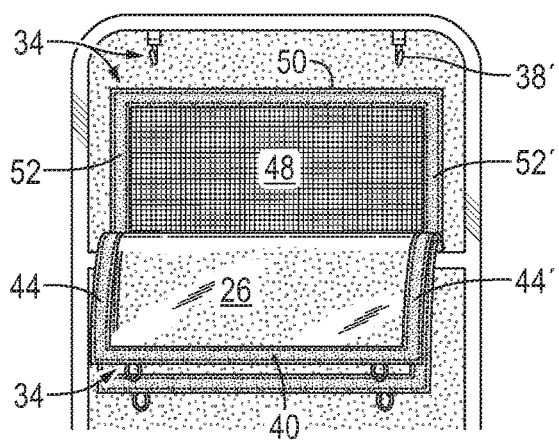
FIG. 4 is a plan interior view of a window for a hunting blind panel having the clear window covering folded down over the blackout covering to permit visibility through the window through the screen.
Figure 5:
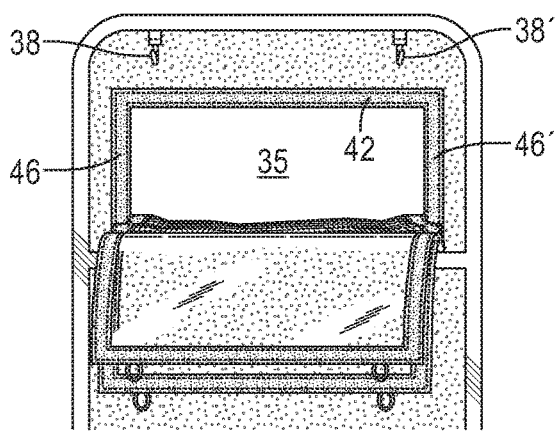
FIG. 5 is a plan interior view of a window for a hunting blind panel having the clear window covering folded down over the blackout covering and the screen pushed out to permit unobstructed visibility through the window opening.

One embodiment of the invention provides a portable hunting blind assembly 2 that is highly suitable for use as a duck blind. The blind comprises a first accordion-fold wall unit 4 and a second accordion fold wall unit 6, each formed from a plurality of panels. The panels 8 of the first wall unit stand taller than the panels of the second wall unit. The first wall unit has a first end and a second end and comprises an even-numbered plurality of panels of at least four in number. Each panel has a width and a first height and the wall unit has a pair of end panels 8', 8" bounding a straight row of interior panels and arranged at about a right angle with respect to the straight row of interior panels. The second wall unit has first end, a second end and comprises an even-numbered plurality of panels 10 of at least four in number each having a width and a second height. The second accordion-fold wall unit has a pair of end panels 10', 10" bounding a straight row of interior panels and arranged at about a right angle with respect to the straight row of interior panels. The second height is in the range of about 60 percent to about 90 percent of the first height. The first end of the first standing accordion-fold wall unit abuts the first end of the second standing accordion-fold wall unit to define a rectangularly-shaped enclosed area 12.

In a preferred embodiment, the blind assembly 2 further comprises a roof frame 14 contacting each of panels of the first standing accordion-fold wall unit and none of the panels of the second standing accordion-fold wall unit, and a covering 16 on the roof frame. This provides any hunters present in the blind with better concealment from waterfowl overhead and some protection from precipitation. More preferably, and as illustrated, a rectangularly shaped first portion of the rectangularly-shaped enclosed area that is bounded on three sides by the second standing accordion-fold wall unit is open to the sky.

Figure 7:
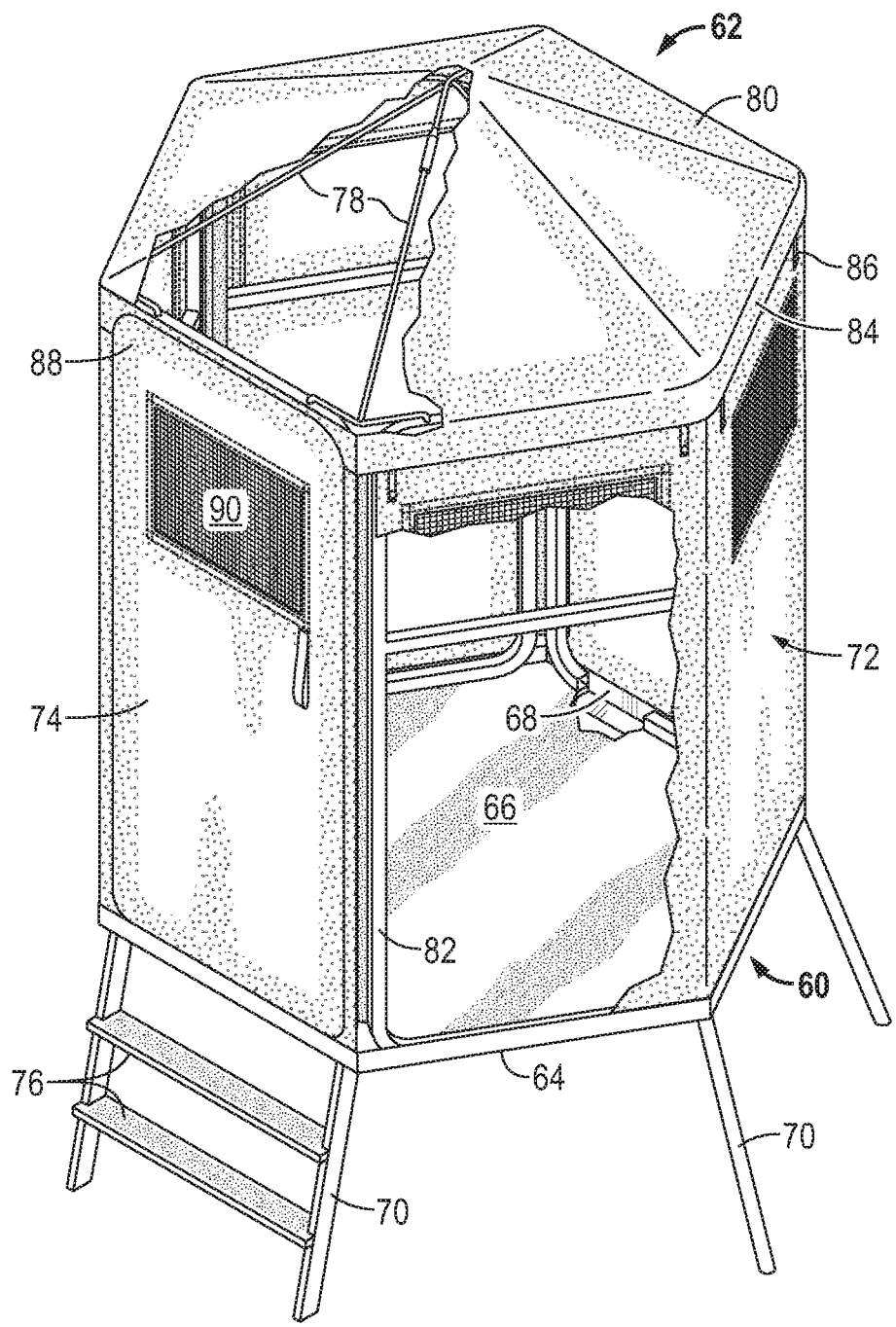
FIG. 7 is an isometric view of an elevated hunting blind according to an embodiment of the invention having portion broken away to show internal details.

Each panel preferably comprises a tubular frame 18 covered in a camouflage material 20. The roof frame 14 is preferably formed from tubular aluminum and the covering on the roof frame is a camouflage material. Square tubing can be used for the panel frames and round tubing for the roof frames. Slightly different roof frames are used in the blinds shown in FIGS. 1 and 7. Generally speaking, the upper header of the panel frames is drilled to receive pins on the roof frames. The roof frames each have two short parallel pins extending transversely from a connecting tubing that connects the pins and an elongated tubular element extending transversely from the connecting tubing from a location between the pins to partially support the roof cover. The two short parallel pins are positioned one in each of the boreholes to position the plane of a first frame at a predetermined angle with the plane of a second frame. Additional frames or pairs of frames and roof frame elements can be used as need to support the roof. The roof frame element also sets the angle between the panels. The blind shown in FIG. 1 has tubular connectors at the distal ends of the elongated tubular elements of the roof frames to receive longitudinally extending tubing that supports the outer edge of the roof cover. The blind shown in FIG. 7 has tubular connectors to receive a tubular element coming from the opposite side of the blind.

For convenience, one of the panels in the first standing accordion-fold wall unit carries a full height door 22 and one of the panels in the second standing accordion-fold wall unit carries a dog door 24.

Another embodiment of the invention provides a clear window 26 for a hunting blind that can be dropped out of the way. The window is attached to a covering 28 for the panel. The covering has a front side 30 and a back side 32, a height and a width, the height being greater than the width, and an upper portion and a lower portion. A generally rectangular window opening 35 is formed in the upper portion of the panel covering. The window has a length and a width, the width being greater than the length and being measured parallel to the width of the generally rectangular piece of panel covering. A flexible clear window cover 26 having a front side and a back side covers the generally rectangular window opening from the inside. The clear window cover has a length and a width that is slightly greater than the window opening. The clear window covering is attached to the inside of the panel covering by its lower edge along the lower edge of the window opening, and is held in covering relationship with the window opening by a releasable fastener system 34 connecting the upper edge of the clear window covering with the back side of the panel covering. In the illustrated embodiment, the fastener system comprises one or more of elastic loops 36, 36' along the upper edge of the clear window cover attachable to hooks 38, 38' near the upper end of the panel covering, a magnetic strip 40 along the upper edge of the clear window cover fastenable, directly or indirectly, to a magnetic strip 42 along the upper edge of the window, and a pair of magnetic strips along the side edges of the clear plastic window 44, 44' fastenable, directly or indirectly, to a pair of magnetic strips 46, 46' along the side edges of the window opening. The lower edge of the clear plastic window can be sewn more or less permanently in place or fastened by a releasable system such as hook and loop strips.

In a preferred embodiment, the generally rectangular covering for a panel further comprises a window screen 48. The window screen covers the generally rectangular window opening and having a length and a width slightly larger than the window opening. The window screen is attached to the inside of the panel covering along the lower edge of the window opening, for example, by sewing or hook and loop strips. The flexible window cover is positioned in covering relationship over the window screen. The screen is preferably a dark plastic mesh to reduce visibility into the blind.

Figure 6:
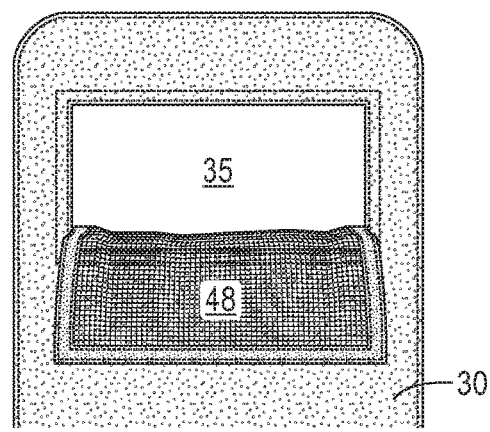
FIG. 6 is a plan outside view of a window for a hunting blind panel having the clear window covering folded down over the blackout covering and the screen pushed out to permit unobstructed visibility through the window opening.

The window screen is preferably attached to the inside of the panel covering along the lower edge of the window opening, for example by sewing or hook and loop strips, and is held in covering relationship with the window opening with a releasable fastener system connecting the upper edge of the screen with the back side of the panel covering. Preferably, the fastener system comprises a magnetic strip 50 attached to the inside of the panel and a magnetic strip such as the aforementioned strip 42 attached to the upper edge of the window screen. More preferably, magnetic strips 52, 52' on the side edges of the screen attach to the aforementioned magnetic strips 46, 46' along the edges of the window, to better keep bugs out of the blind when it is in use. The magnetic strips permit the screen to be pushed outward, as shown in FIG. 6, if the hunter desires to take a shot. Alternatively, a hole can be shot in the mesh.

In a preferred embodiment of the invention, the panel covering further comprises a window blackout cover 54. The window blackout cover covers the generally rectangular window opening and has a length and a width slightly larger than the window opening. The window blackout cover is attached to the inside of the panel covering along the lower edge of the window opening. Preferably, the window blackout cover is positioned in covering relationship over the clear window cover. The window blackout cover is preferably held in covering relationship with the window opening with a releasable fastener system 56 connecting the upper edge of the window blackout cover with the back side of the panel covering. Loops 58, 58' attached to an upper edge of the window blackout cover and hooks 38, 38' as aforementioned attached near the upper edge of the panel covering have been used with good results. Preferably, the blackout cover is of the same material and material as the panel covering, such as camouflage. The blackout cover is used to prevent an animal from seeing movements in the blind silhouetted against the opposite windows.

In another embodiment of the invention, elevation of a hunting blind 62 is provided by mounting on a platform 60. The platform comprises a hexagonal frame 64 formed from straight sections of angle stock positioned to have a leg extending upwardly. A floor 66 is positioned in the hexagonal frame. It can be formed in two portions if desired to facilitate transport. A portion of the angle stock protrudes above the floor periphery to form a peripheral lip 68 around the floor. A plurality of legs 70 extend downwardly and outwardly from the frame to elevate the platform above ground level. The hunting blind comprises six panels 72 joined together for accordion folding positioned on the platform with a base of each panel adjacent to the lip of a straight section of angle stock to register the blind in fixed position on the platform. Preferably, one of the panels defines a door 74 and a plurality of steps 76 extends between a pair of adjacent legs supporting the platform to form a ladder to the door.

The blind part 62 preferably comprises a roof frame 78, and a roof covering 80. The plurality of panels each has a generally rectangular frame 82 joined together with adjacent frames for accordion folding. At least one frame of the plurality mounts the door which itself comprises a generally rectangular frame. The frames are covered with a camouflage material to form the panels and positioned in a standing arrangement to form a closure. The roof frame connects upper ends of the panel frames.

The roof covering is positioned over the roof frame and has having a peripheral lip 84 extending over an outer surface of the upper ends of the panels and the upper end of the frame mounting the door. Straps 86 depend from the lip and carry fastener halves for engaging complementary fastener halves on the outer surfaces of the panels, except for the door panel, to retain the roof in position. The camouflage material covering the door has an upper end 88 that closes in covering relationship over the lip of the roof covering the upper end of the door frame. Windows 90 are provided in at least some of the panels.

While certain preferred embodiments have been described herein, the invention is not to be construed as being so limited, except to the extent that such limitations are found in the claims.

What is claimed is:

1. A portable hunting blind comprising
    a plurality of wall panels each comprising a generally rectangular panel frame covered in a camouflage material, and a door panel comprising a generally rectangular door frame covered in a camouflage material and mounted in a generally rectangular carrying frame, said carrying frame and said panel frames being joined together for accordion folding and positioned in a standing arrangement to form a closure,
    a roof frame connecting upper ends of the panel frames and a roof covering positioned over the roof frame, said roof covering having a peripheral lip extending over an outer surface of the upper ends of the wall panels and the upper end of the carrying frame mounting the door panel, and straps depending from the lip, said straps carrying fastener halves for engaging complementary fastener halves on the outer surfaces of the panels except for the door panel to retain the roof in position;
    wherein the camouflage material covering the door frame has an upper end that closes in covering relationship over the lip of the roof covering the upper end of the door carrying frame.

2. The portable hunting blind as in claim 1, further comprising windows in at least some of the panels.

* * * * *